(12) United States Patent  
Denton et al.

(10) Patent No.: US 7,894,457 B2
(45) Date of Patent: *Feb. 22, 2011

(54) OPTICAL NETWORKING MODULE INCLUDING PROTOCOL PROCESSING AND UNIFIED SOFTWARE CONTROL

(75) Inventors: I. Claude Denton, Beaverton, OR (US); Bruce Murdock, Beaverton, OR (US); James L. Gimlett, Tigard, OR (US); Edward L. Hershberg, Portland, OR (US); Scott W. Lowrey, Portland, OR (US); Richard A. Booman, Lake Oswego, OR (US); Alfred C. She, Beaverton, OR (US)

(73) Assignee: Null Networks LLC, Las Vegas, NV (US)

( * ) Notice: Subject to any disclaimer, the term of this patent is extended or adjusted under 35 U.S.C. 154(b) by 1170 days.

This patent is subject to a terminal disclaimer.

(21) Appl. No.: 11/513,676

(22) Filed: Aug. 30, 2006

(65) Prior Publication Data

US 2007/0058985 A1    Mar. 15, 2007

Related U.S. Application Data

(63) Continuation of application No. 10/414,115, filed on Apr. 14, 2003, now Pat. No. 7,570,650, which is a continuation of application No. 09/861,002, filed on May 18, 2001, now Pat. No. 6,567,413.

(51) Int. Cl.
*H04L 12/28* (2006.01)
*H04J 3/16* (2006.01)
(52) U.S. Cl. .................................... 370/401; 370/465
(58) Field of Classification Search ......... 370/400–408, 370/465–474; 389/118, 135
See application file for complete search history.

(56) References Cited

U.S. PATENT DOCUMENTS 5,768,530 A    6/1998  Sandorfi
6,075,788 A    6/2000  Vogel (Continued)

OTHER PUBLICATIONS

International Search Report, issued in PCT Application No. PCT/US2002/015800, mailed Aug. 29, 2002.

(Continued)

*Primary Examiner*—Steven H Nguyen
(74) *Attorney, Agent, or Firm*—Schwabe, Williamson & Wyatt, P.C.

(57) ABSTRACT

An optical networking module is formed with an integrated module including optical, optical-electrical and protocol processing components, and complementary software. In one embodiment, the integral protocol processing component is a single ASIC and supports multiple protocols. The module is further equipped with support control electronics in support of control functions to manage the optical, optical-electrical as well as the multi-protocol processing component. The integrated module together with the complementary control software present to an optical networking equipment designer/developer a singular component that handles optical to electrical and electrical to optical conversion, as well as data link and physical sub-layer processing for a selected one of a plurality of datacom and telecom protocols, spanning local, regional as well as wide area networks. The integrated module and complementary control software further presents to the optical networking designer/developer a unified software interface for managing-the various components and functions.

31 Claims, 4 Drawing Sheets

U.S. PATENT DOCUMENTS

| | | | |
|---|---|---|---|
| 6,160,813 | A | 12/2000 | Banks et al. |
| 6,178,170 | B1 | 1/2001 | Duree et al. |
| 6,359,859 | B1 | 3/2002 | Brolin et al. |
| 6,414,966 | B1 | 7/2002 | Kulkarni et al. |
| 6,417,944 | B1 | 7/2002 | Lahat et al. |
| 6,567,413 | B1 * | 5/2003 | Denton et al. ............... 370/401 |
| 6,639,910 | B1 | 10/2003 | Provencher et al. |
| 6,961,348 | B2 | 11/2005 | Yu |
| 6,973,041 | B1 | 12/2005 | Duschatko et al. |
| 7,274,691 | B2 | 9/2007 | Rogers |
| 7,570,650 | B2 * | 8/2009 | Denton et al. ............... 370/401 |
| 2002/0089715 | A1 | 7/2002 | Mesh et al. |
| 2003/0163555 | A1 * | 8/2003 | Battou et al. ............... 709/223 |

OTHER PUBLICATIONS

International Preliminary Examination Report, issued in PCT Application No. PCT/US2002/015800, mailed Oct. 30, 2003.

Office Action, issued in U.S. Appl. No. 09/861,002, mailed Jul. 31, 2002.

Office Action, issued in U.S. Appl. No. 09/861,002, mailed Jan. 29, 2003.

Notice of Allowance, issued in U.S. Appl. No. 09/861,002, mailed Mar. 6, 2003.

Office Action, issued in U.S. Appl. No. 10/414,115, mailed Feb. 5, 2008.

Office Action, issued in U.S. Appl. No. 10/414,115, mailed Jul. 29, 2008.

Office Action, issued in U.S. Appl. No. 10/414,115, mailed Jan. 13, 2009.

Notice of Allowance, issued in U.S. Appl. No. 10/414,115, mailed Mar. 27, 2009.

* cited by examiner

Static Network Functions 130

- Initialization and Termination ~412
- Protocol Flow ~414
- Configuration ~416
- Module Management ~418

Dynamic Network Function 140

- Physical Layer ~422
- Interrupt Monitoring and Interrupt Handling ~424
- General Operational Monitoring ~426

Figure 4

OPTICAL NETWORKING MODULE INCLUDING PROTOCOL PROCESSING AND UNIFIED SOFTWARE CONTROL

This is a continuation of U.S. patent application Ser. No. 10/414,115, filed on Apr. 14, 2003, now issued as U.S. Pat. No. 7,570,650, which is a continuation of U.S. patent application Ser. No. 09/861,002, filed on May 18, 2001, which has issued as U.S. Pat. No. 6,567,413.

BACKGROUND OF THE INVENTION

1. Field of the Invention

The present invention relates to the field of networking. More specifically, the present invention relates to optical networking module employed in high speed network trafficking equipment, such as 10 gigabit optical-electrical routers or switches.

2. Background Information

With advances in integrated circuit, microprocessor, networking and communication technologies, increasing number of devices, in particular, digital computing devices, are being networked together. Devices are often first coupled to a local area network, such as an Ethernet based office/home network. In turn, the local area networks are interconnected together through wide area networks, such as SONET networks, ATM networks, Frame Relays, and the like. Of particular importance is the TCP/IP based global inter-network, the Internet. Historically, data communication protocols specified the requirements of local/regional area networks, whereas telecommunication protocols specified the requirements of the regional/wide area networks. The rapid growth of the Internet has fueled a convergence of data communication (datacom) and telecommunication (telecom) protocols and requirements. It is increasingly important that data traffic be carried efficiently across local, regional and wide area networks.

As a result of this trend of increased connectivity, increasing number of applications that are network dependent are being deployed. Examples of these network dependent applications include but are not limited to, the world wide web, email, Internet based telephony, and various types of e-commerce and enterprise applications. The success of many content/service providers as well as commerce sites depend on high speed delivery of a large volume of data across wide areas. In turn, the trend leads to increased demand for high speed data trafficking equipment, such as high speed optical-electrical routers or switches and so forth.

In the early generations of optical-electrical networking trafficking equipment, separate individual optical, optical-electrical and protocol processing components were employed. Moreover, multiple protocol processing components had to be employed, as each component performed data link and physical sub-layer processing for a corresponding protocol. Further, these separate components were typically developed or available from different vendors, with each component having its own approach and interface to configuration and operational management. As a result, an optical network trafficking equipment designer/manufacturer has had to work and deal with the optical, electrical and protocol processing aspects separately, as separate components, and often via very different interfaces. As system complexity and data rates have increased, this engineering challenge has become increasingly difficult to solve, resulting in time-to-market and cost disadvantages.

Recently, some component suppliers, such as Network Elements, Inc, of Beaverton, Oreg., have begun to offer optical network modules that integrate the optical and optical-electrical components. Representatives of these integrated modules are Network Elements' ONM10PHY and ONM10PHYOXC optical networking modules. These integrated modules are designed for high speed optical networking applications in the realm of 10 Gb/s DWDM, SONET/SDH, and Ethernet LAN and WAN. These integrated modules perform physical layer functions such as optical-to-electrical and electrical-to-optical conversion, clock and data recovery, transmit clock multiplication, serialization and deserialization functions.

While the availability of these integrated components improve the productivity of high speed network traffic equipment designers, the handling of data link and physical sub-layer processing for different protocols have fundamentally remained the responsibilities of separate ASICs from different vendors. At 10 Gb/s and beyond, the integration of these processing ASICs with optoelectronic and software systems becomes increasingly difficult, even as the continuing growth of the Internet demands faster time to market and higher system flexibility. A need exists to reduce the complexity of designing optical network trafficking equipment.

SUMMARY OF THE INVENTION

An optical networking module is formed with an integrated module including optical, optical-electrical, and protocol processing components, and complementary control software. In one embodiment, the integral protocol processing component is a single ASIC and processes multiple protocols with data rates of at least 10 Gb/s. The module is further equipped with support control electronics in support of control functions to manage the optical, optical-electrical as well as the multi-protocol processing component.

The integrated module together with the complementary control software present to an optical networking equipment designer/developer a singular component that handles optical to electrical and electrical to optical conversion, as well as data link and physical sub-layers processing for a selected one of a plurality of datacom and telecom protocols, spanning local, regional as well as wide area networks. The integrated module and complementary control software further present to the optical networking designer/developer a unified software interface for managing the various components and functions.

BRIEF DESCRIPTION OF DRAWINGS

The present invention will be described by way of exemplary embodiments, but not limitations, illustrated in the accompanying drawings in which like references denote similar elements, and in which:

FIG. 4 illustrates the static and dynamic networking functions of FIG. 2 in further details, in accordance with one embodiment.

GLOSSARY

| | |
|---|---|
| 10Gbase-LR | 64/66 coded 1310 nm LAN standard for 10 Gigabit Ethernet |
| 10Gbase-LW | 64/66 coded SONET encapsulated 1310 nm WAN standard for 10 Gigabit Ethernet |
| ASIC | Application Specific Integrated Circuit |
| DWDM | Dense Wavelength Division Multiplexing |
| Egress | Outgoing data path from the system to the network |
| FCS | Frame Check Sequence |
| HDLC | High-level Data Link Control. A communication protocol used in Packet over SONET switching network. |
| Ingress | Incoming data path from the network to the system |
| IP | Internet Protocol |
| LAN | Local Area Network |
| LVDS | Low voltage differential signal |
| MAC | Media Access Control layer, defined for Ethernet systems |
| OIF | Optical Internetworking Forum |
| POS | Packet over SONET |
| PPP | Point to Point Protocol |
| SDH | Synchronous Digital Hierarchy |
| SONET | Synchronous Optical network, a PHY telecommunication protocol |
| SPI-4 | System Packet Interface Level 4 (also POS-PHY 4) |
| SSTL | Stub Series Terminated Logic |
| XGMII | 10 Gb Media Independent Interface |
| WAN | Wide Area Network |

DETAILED DESCRIPTION OF THE INVENTION

In the following description, various aspects of the present invention will be described. However, it will be apparent to those skilled in the art that the present invention may be practiced with only some or all aspects of the present invention. For purposes of explanation, specific numbers, materials and configurations are set forth in order to provide a thorough understanding of the present invention. However, it will also be apparent to one skilled in the art that the present invention may be practiced without the specific details. In other instances, well known features are omitted or simplified in order not to obscure the present invention. Further, the description repeatedly uses the phrase "in one embodiment", which ordinarily does not refer to the same embodiment, although it may.

Overview

Figure 1:
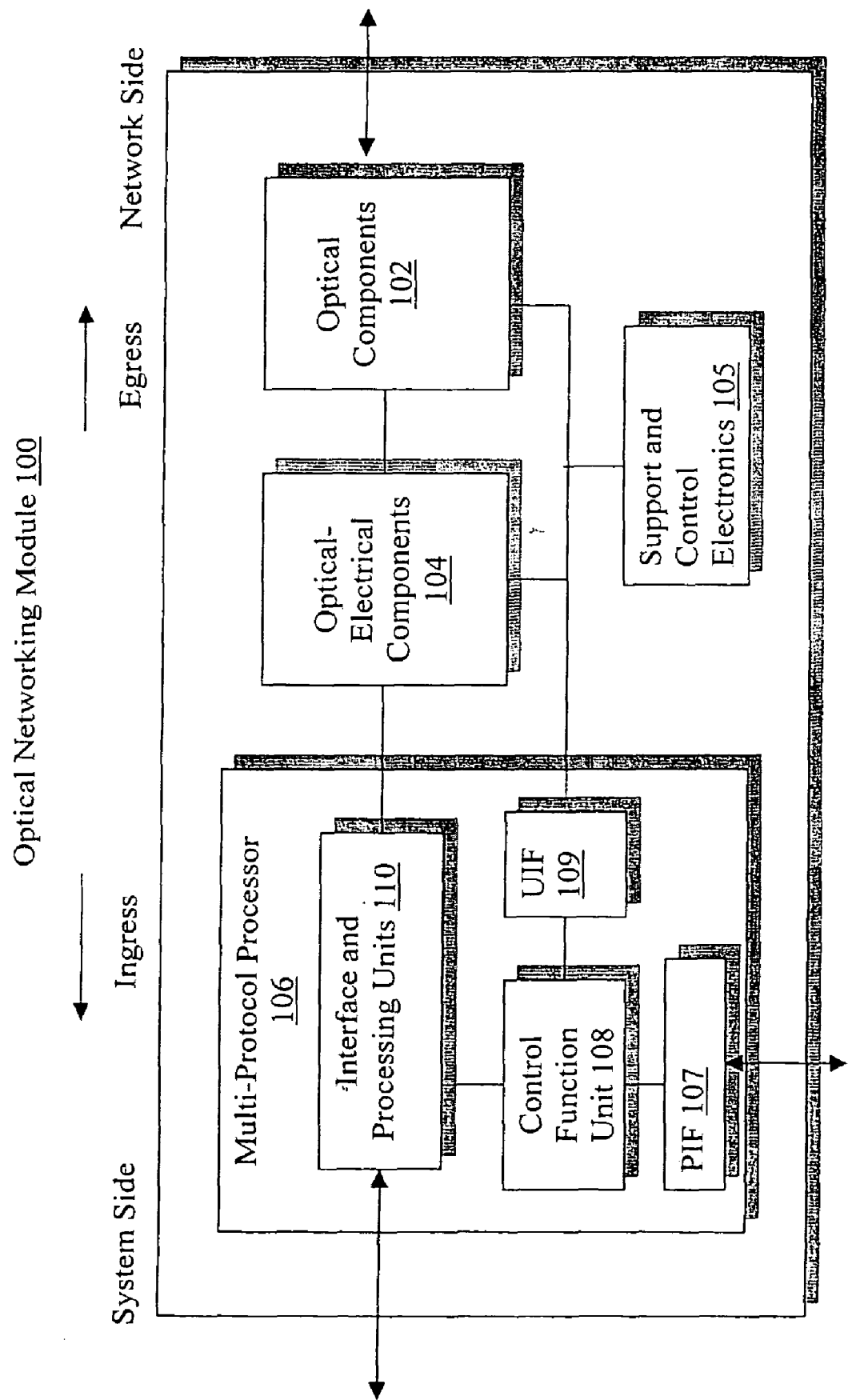
FIG. 1 illustrates an overview of the optical networking module of the present invention, in accordance with one embodiment.
Figure 2:
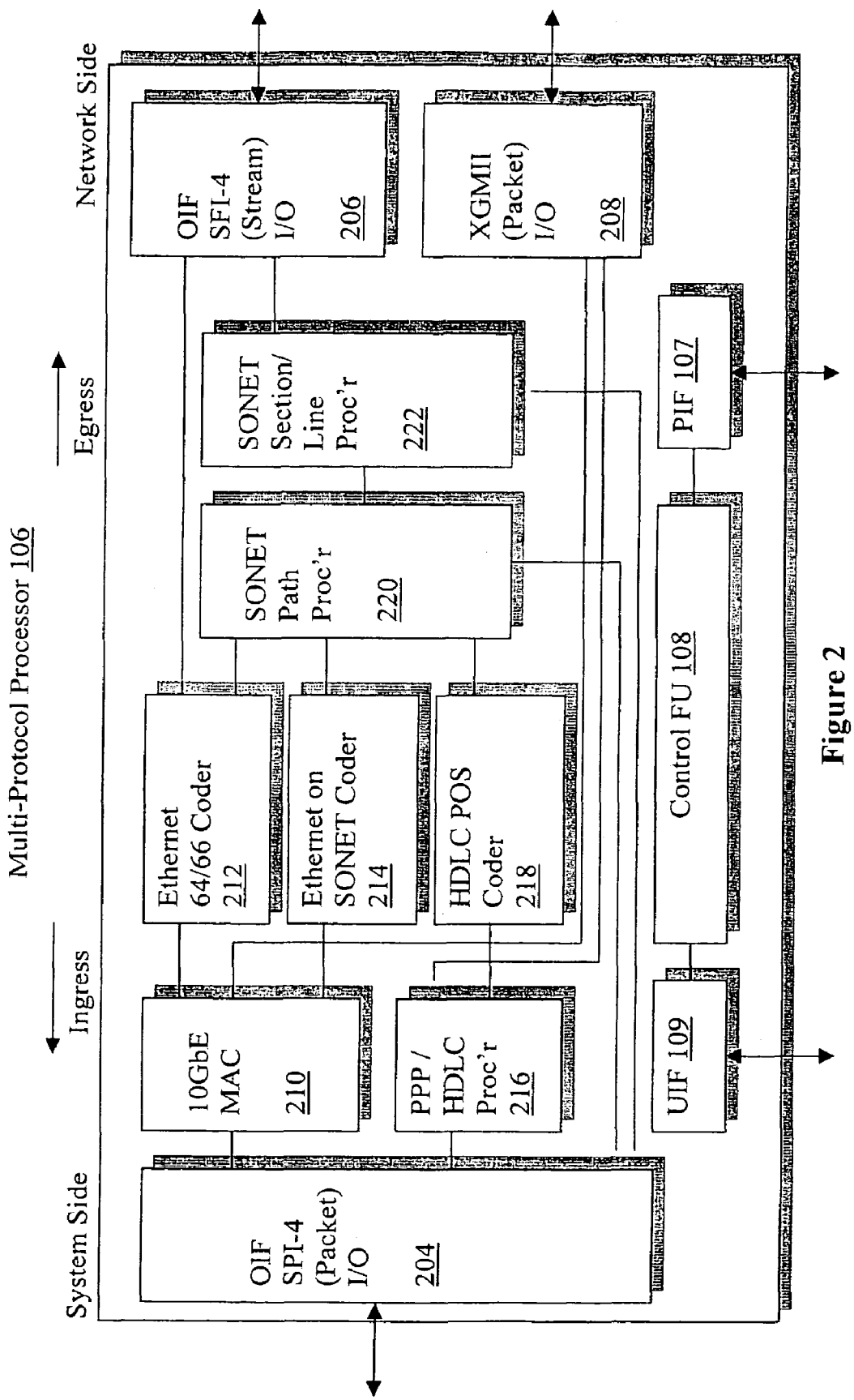
FIG. 2 illustrates the multi-protocol network processor of FIG. 1 in further details, in accordance with one embodiment.

Referring now to FIG. 1, wherein a block diagram illustrating the integrated optical networking module of the present invention, in accordance with one embodiment, is shown. As illustrated, integrated optical networking module 100 of the present invention includes optical components 102, optical-electrical components 104, support control electronics 105, and protocol processor 106, coupled to each other as shown. Protocol processor 106 includes in particular, a number of interfaces and processing units 110, control function unit 108, processor interface 107 and utility interface 109 coupled to each other and components 102-104 as shown. In one embodiment, protocol processor 106 supports multiple datacom and telecom protocols.

Optical components 102 are employed to facilitate the sending and receiving of optical signals encoded with data transmitted in accordance with a selected one of a plurality of protocols known in the art. Optical-electrical components 104 are employed to encode the egress data onto the optical signals, and decode the encoded ingress data. Examples of such protocols include but are not limited to SONET/SDH, 10Gbase-LR, 10Gbase-LW, Ethernet on SONET, Packet on SONET, and so forth. Support control electronics 105 are employed to facilitate management of the various aspects of optical components 102 and optical-electrical components 104. Multi-protocol processor 106 is employed to perform data link and physical sub-layer processing on the egress and ingress data in accordance with a selected one of a plurality of supported protocols, and to facilitate management of the multi-protocol processor 106 itself and optical, optical-electrical components 102 and 104 (through support control electronics 105).

In a preferred embodiment, multi-protocol processor 106 is implemented in the form of an ASIC. Optical components 102, optical-electrical components 104, support control electronics 105 and multi-protocol processor ASIC 106 are encased in a body (not shown) forming a singular optical networking module, with provided software forming a singular control interface for all functionality. That is, in addition to being equipped to provide optical to electrical and electrical to optical conversions, clock and data recovery, and so forth, integrated optical networking module 100 is also equipped to provide data link and physical sub-layer processing on egress and ingress data selectively for a number of protocols.

Figure 3:
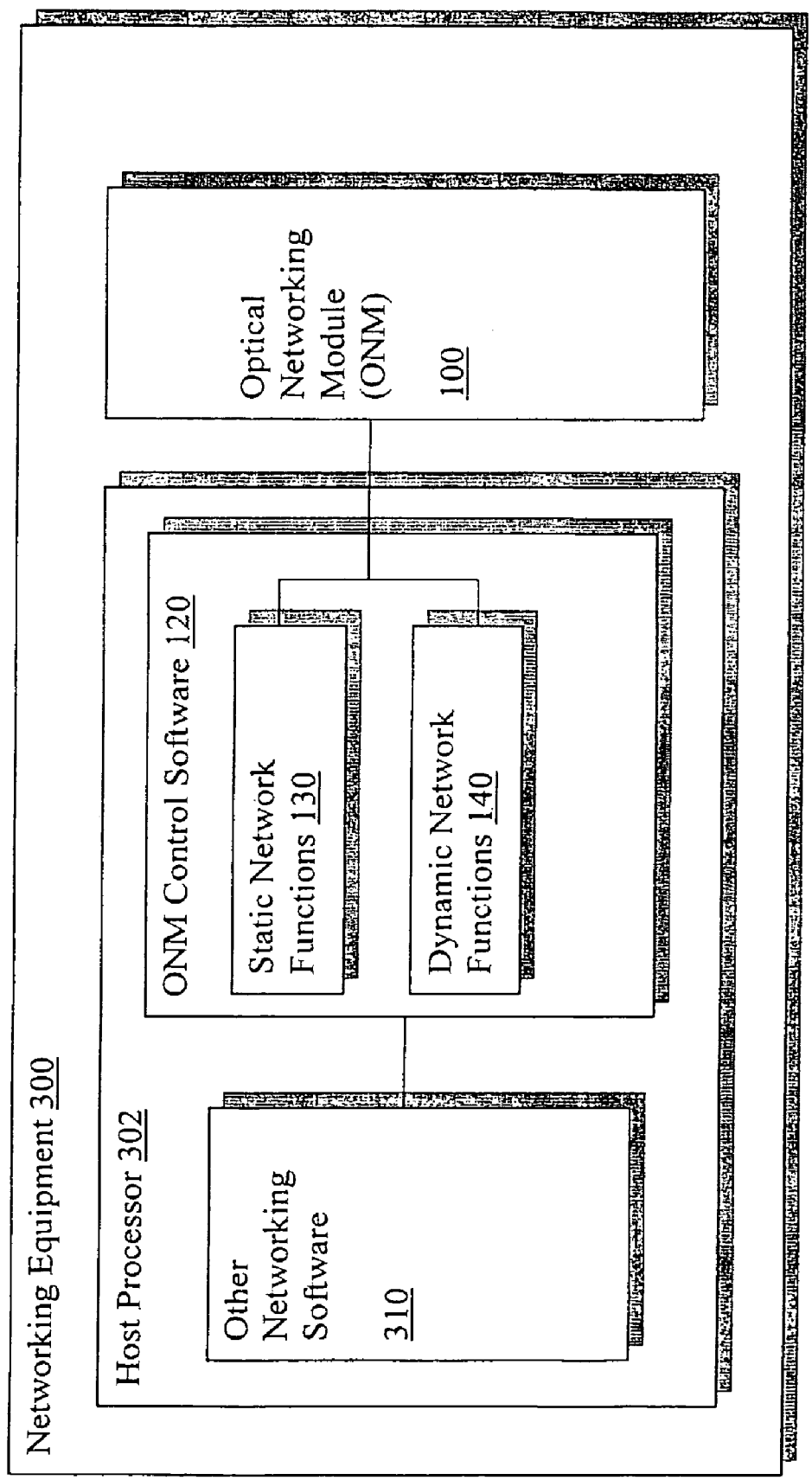
FIG. 3 illustrates an optical networking equipment incorporated with the optical networking module of the present invention.

Further, in the preferred embodiment, control function unit 108 also includes control features, i.e. control registers and the like (not shown), in conjunction with support control electronics 105 to support a number of control functions for managing optical components 102, optical-electrical components 104 as well as multi-process protocol ASIC 106. Processor interface 107 is employed to facilitate provision of control specifications to control function unit 108, whereas utility interface 109 (a digital interface) is employed to facilitate management of components 102 and 104 by control function unit 108 (by way of support control electronics 105). The complementary control functions are placed with an embedded processor of an optical networking equipment employing integrated optical network module 100 of the present invention (FIGS. 3 & 4). That is, integrated optical networking module 100 of the present invention (the illustrated embodiment) also advantageously presents a singular unified software interface to optical networking equipment designers and developers to manage configuration and operation of the optical and electrical components, as well as protocol processing. As those skilled in the art would appreciate, as a result of the novel integration and unified presentation of these functions, the complexity of designing optical networking equipment, such as optical-electrical routers, switches, and the like, is reduced.

Before further describing the present invention, it should be noted that while inclusion of control processor 108, processor interface 107 and utility interface 109 with multi-protocol processor ASIC 106 is preferred, the present invention may nevertheless be practiced with some or all of the control function and the associated interfaces disposed away from multi-protocol processor ASIC 106 (but within integrated optical networking module 100), so long the desired unified experience for managing the optical, electrical and protocol processing aspects is substantially maintained.

What is claimed is:

1. An optical networking module, comprising:
   an optical component to send and receive optical signals encoded with data;
   an optical-electrical component coupled to the optical component to encode an egress portion of said data to modulate to optical signals, and to decode optical signals to provide an ingress portion of said data;

a multi-protocol processor including:
    a protocol processor component coupled to the optical-electrical component to perform at least one of data link or physical sub-layer processing on at least a portion of said data in accordance with a selected one of a plurality of protocols;
    a control function unit;
    a processor interface configured to facilitate provision of control specifications to the control function unit for managing the optical component, optical-electrical component and the multi-protocol processor; and
    a digital interface separate from the processor interface and disposed outside of said protocol processor component to support external software control functions in managing by the control function unit at least one of said optical and optical-electrical components; and
a body encasing said optical component, said optical-electrical component, and said protocol processor component as a single module.

2. The optical network module of claim 1, wherein said external software control functions include a plurality of static control functions, and a plurality of dynamic control functions.

3. The optical networking module of claim 2, wherein said static control functions include at least a selected one of an initialization and termination function, a protocol selection function, a configuration function or a module management function.

4. The optical networking module of claim 2, wherein said dynamic control functions include at least a selected one of a physical layer processing request function, an interrupt monitoring and handling function, or a monitoring function.

5. The optical network module of claim 1, wherein said external software control functions include at least one static control function selected from a group consisting of an initialization and termination function, a protocol selection function, a configuration function and a module management function.

6. The optical networking module of claim 1, wherein said external software control functions include at least one dynamic control function selected from a group consisting of a physical layer processing request function, an interrupt monitoring and handling function, and a monitoring function.

7. The optical networking module of claim 1, wherein said optical network module further comprises supporting control electronics including selected ones of thermal sensors, power sequencer, analog-to-digital and digital-to-analog converters to facilitate said management of said optical and said optical-electrical components through said digital interface and control function unit of the multi-protocol processor.

8. The optical network module of claim 7, wherein the digital interface disposed outside said protocol processor component is further adapted to support said external software control functions in managing at least a portion of said support control electronics.

9. The optical network module of claim 1, wherein said optical and optical-electrical components and said protocol processor are adapted to support data rates of at least 10 GB/s.

10. The optical network module of claim 1, wherein said protocol processor component is configured to support a plurality of datacom and telecom protocols.

11. A multi-protocol processor, comprising:
    a plurality of input/output (I/O) interfaces to transmit or receive data transmitted in accordance with a selected one of a plurality of protocols over an optical transmission medium;
    a plurality of data link and physical sub-layer processing units selectively coupled to one another and to the I/O interfaces to be selectively employed in combination to perform selected data link and physical sub-layer processing on egress and ingress portions of said data, in accordance with said selected protocol;
    a utility interface to facilitate management of one or more aspects of at least a selected optical component or optical-electrical component to be used in tandem with said multi-protocol processor in forming a singular integrated optical networking module; and
    a processor interface separate from the utility interface and configured to facilitate provision of control specifications to a control function unit for managing the multi-protocol processor, selected optical component, and optical-electrical component;
    wherein the control function unit is coupled to said plurality of I/O interfaces, said plurality of data link and physical sub-layer processing units and said utility interface to facilitate management of said multi-protocol processor, and said one or more aspects through said plurality of data link and physical sub-layer processing units, by external software control functions coupled to said multi-protocol processor.

12. The processor of claim 11, wherein said external software control functions comprise a plurality of static control functions and a plurality of dynamic control functions.

13. The processor of claim 11, wherein said external software control functions include at least one static control function selected from a group consisting of an initialization and termination function, a protocol selection function, a configuration function and a module management function.

14. The processor of claim 11, wherein said external software control functions include at least one dynamic control function selected from a group consisting of a physical layer processing request function, an interrupt monitoring and handling function, and a monitoring function.

15. The processor of claim 11, wherein said interfaces, said control function unit and said plurality of data link and physical sub-layer processing units are all adapted to support data rates of at least 10 GB/s.

16. An embedded processor comprising:
    a storage medium having stored thereon a plurality of programming instructions configured to implement a plurality of optical networking module management functions to manage a protocol processing component included in an optical networking module and at least one aspect of an optical component or an optical-electrical component included in the optical networking module; and
    an execution unit coupled to the storage medium and configured to cause executione of the plurality of programming instructions;
    wherein the protocol processing component is included in a multi-protocol processor, the multi-protocol processor including:
        a control function unit;
        a processor interface configured to facilitate provision of control specifications to the control function unit for managing the optical component, optical-electrical component and the multi-protocol processor; and
        a digital interface separate from the processor interface and disposed outside of the protocol processing component to support external software control functions in managing by the control function unit at least one of the optical and optical-electrical components.

17. The embedded processor of claim 16, wherein the plurality of optical networking module management functions comprise control functions including a plurality of static control functions or a plurality of dynamic control functions.

18. The embedded processor of claim 17, wherein said plurality of static control functions include a static control function selected from a group consisting of at least one initialization and termination function, one protocol selection function, one configuration function, and one module management function.

19. The embedded processor of claim 17, wherein said plurality of dynamic control functions include a dynamic control function selected from a group consisting of at least one physical layer processing request function, one interrupt monitoring and handling function, and one monitoring function.

20. The embedded processor of claim 16, wherein said optical networking module is configured to support data rates of at least 10 GB/s.

21. The embedded processor of claim 16, wherein said protocol processing component of said optical networking module comprises a multi-protocol processor to support a plurality of protocols.

22. A networking apparatus comprising:
a switch;
an optical networking module including an optical component, an optical-electrical component, supporting control electronics and a protocol processing component, wherein the optical component, the optical-electrical component, the supporting control electronics and the protocol processing component are adapted to cooperate with one another for facilitating processing of data transmitted between said switch and an optical transmission medium in accordance with a selected one of a plurality of protocols; and
an embedded processor coupled to the optical networking module, and having a plurality of programming instructions configured to implement a plurality of optical networking module management functions to manage the protocol processing component and at least one aspect of at least a selected one of said optical component or said optical-electrical component through said protocol processing component,
wherein the optical networking module further includes:
a control function unit;
a processor interface configured to facilitate provision of control specifications to the control function unit for managing the optical component, optical-electrical component and the protocol processing component; and
a digital interface separate from the processor interface and disposed outside of said protocol processing component to support external software control functions in managing by the control function unit at least one of said optical and optical-electrical components via the supporting control electronics.

23. The networking apparatus of claim 22, wherein said optical networking module management functions comprise a plurality of static control functions, and a plurality of dynamic control functions.

24. The networking apparatus of claim 23, wherein said plurality of static control functions include a static control function selected from a group consisting of an initialization and termination function, a protocol selection function, a configuration function, and a module management function.

25. The networking apparatus of claim 23, wherein said plurality of dynamic control functions include a dynamic control function selected from the group consisting of a physical layer processing request function, an interrupt monitoring and handling function, and a monitoring function.

26. A method, comprising:
receiving by an optical component, an optical signal encoded with data transmitted in accordance with at least one protocol;
performing by a protocol processor component coupled to the optical component and included in a single module together with the optical component, at least one of data link or physical sub-layer processing on at least a portion of the data in accordance with a selected one of a plurality of protocols; and
implementing at least in part by an embedded processor, a plurality of static control functions and a plurality of dynamic control functions to manage the protocol processor component and the optical component, wherein management of the protocol processor component and the optical component are facilitated by a control function unit and a processor interface configured to facilitate provision of control specifications to the control function unit for managing the optical component and the protocol processor component;
wherein management of the protocol processor component and the optical component are further facilitated by a digital interface separate from the processor interface and disposed outside of said protocol processor component to support the plurality of static control functions and a plurality of dynamic control functions implemented at least in part by the embedded processor.

27. The method of claim 26 wherein the embedded processor is coupled to the single module including the protocol processor component and the optical component.

28. The method of claim 26, further comprising decoding the data on the optical signal into digital form by an optical electrical component.

29. The method of claim 28 further comprising managing said optical electrical component via said utility interface.

30. An apparatus, comprising:
means for receiving an optical signal encoded with data transmitted in accordance with at least one protocol;
means for performing at least one of data link or physical sub-layer processing on at least a portion of the data in accordance with a selected one of a plurality of protocols;
processor interface means configured to facilitate provision of control specifications to a control function unit for managing the means for receiving the optical signal and the means for performing the at least one of data link or physical sub-layer processing;
digital interface means separate from the processor interface means for supporting external software control functions in managing by the control function unit the means for receiving the optical signal; and
embedded processor means for implementing the external software control functions including a plurality of static control functions and a plurality of dynamic control functions to manage the means for receiving the optical signal and the means for performing the at least one of data link or physical sub-layer processing.

31. The apparatus of claim 30, further comprising means for decoding the data encoded on the optical signal into digital form.

* * * * *

UNITED STATES PATENT AND TRADEMARK OFFICE
CERTIFICATE OF CORRECTION

| | | |
|---|---|---|
| PATENT NO. | : 7,894,457 B2 | |
| APPLICATION NO. | : 11/513676 | |
| DATED | : February 22, 2011 | |
| INVENTOR(S) | : Denton et al. | |

It is certified that error appears in the above-identified patent and that said Letters Patent is hereby corrected as shown below:

Title page, item (57), under "Abstract", in Column 2, Line 18, delete "managing-the" and insert -- managing the --.

Column 6, Line 53, in Claim 16, delete "executione" and insert -- execution --.

Signed and Sealed this
Thirty-first Day of May, 2011

David J. Kappos
*Director of the United States Patent and Trademark Office*